United States Patent [19]

Tsuji

[11] Patent Number: 4,636,996
[45] Date of Patent: Jan. 13, 1987

[54] ULTRASONIC OBSTACLE LOCATION APPARATUS AND METHOD

[75] Inventor: Akio Tsuji, Tokyo, Japan

[73] Assignee: Casio Computer Co., Ltd., Tokyo, Japan

[21] Appl. No.: 732,559

[22] Filed: May 9, 1985

[30] Foreign Application Priority Data

May 25, 1984 [JP] Japan .................. 59-106098

[51] Int. Cl.⁴ .............................................. G01S 15/46
[52] U.S. Cl. ...................................... 367/93; 367/96;
367/107; 367/127; 367/909
[58] Field of Search ................ 367/909, 127, 99, 93,
367/96, 107, 112, 907

[56] References Cited

U.S. PATENT DOCUMENTS

| | | | |
|---|---|---|---|
| 3,493,920 | 2/1970 | MacMunn | 367/96 |
| 3,715,577 | 2/1973 | Bohman | 367/127 |
| 3,742,435 | 6/1973 | Pann et al. | 367/127 |
| 4,103,278 | 7/1978 | Satake et al. | 367/107 |
| 4,240,152 | 12/1980 | Duncan et al. | 367/909 |
| 4,281,241 | 7/1981 | Knight et al. | 367/127 |
| 4,459,689 | 7/1984 | Biber | 367/93 |
| 4,528,563 | 7/1985 | Takeuchi | 367/909 |

FOREIGN PATENT DOCUMENTS 3104300  8/1982  Fed. Rep. of Germany .

Primary Examiner—Glen R. Swann, III
Attorney, Agent, or Firm—Frishauf, Holtz, Goodman & Woodward

[57] ABSTRACT

An obstacle sensing area ahead of a mobile robot is divided into a plurality of sensing regions. A number of ultrasonic transmitters and plural receivers on the robot cooperate to detect the presence of obstacles in the sensing regions. Coordinates representing four corners of each sensing region, and time data representing a time period from emission of ultrasonic waves from selected transmitters to reception of the waves by each receiver when the waves are reflected by an obstacle at each corner point, are prestored in data ROMs. The data ROMs are retrieved by a CPU in response to obtained time data, and precise position data of the obstacle in the sensing area is determined.

12 Claims, 7 Drawing Figures

F I G. 5B
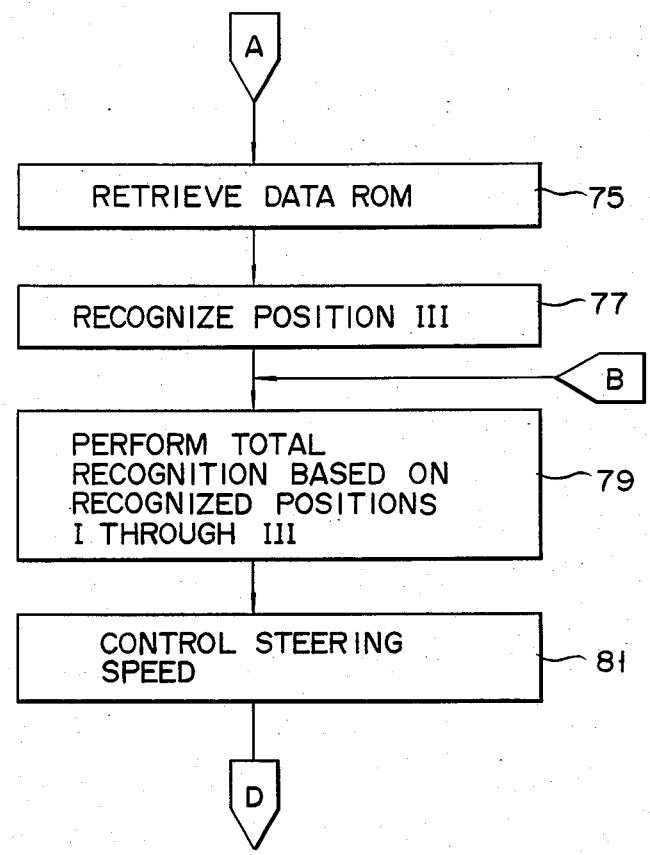

ULTRASONIC OBSTACLE LOCATION APPARATUS AND METHOD

BACKGROUND OF THE INVENTION

The present invention relates to an obstacle detection apparatus used in a self-running robot, and a method of detecting obstacles.

Conventional self-running robot systems have been used in offices and factories to transport articles. An obstacle detection apparatus is required to prevent such a self-running robot from bumping against an obstacle. A conventional obstacle detection apparatus comprises an ultrasonic transducer. Such an ultrasonic transducer is used to detect an obstacle only by distance data. When the route of the self-running robot is simple, the robot can be guided by only the distance data. However, when the route is complicated and the robot must be guided and diverted around obstacles, position data as well as distance data is required. In order to meet such a demand, a shape recognition method by waveform analysis using an ultrasonic sonar system has been developed.

However, such a method requires a long processing time and a large system, resulting in inconvenience.

SUMMARY OF THE INVENTION

It is an object of the present invention to provide an obstacle detection apparatus and a method therefor, wherein position data as well as distance data of an obstacle can be detected with a simple system arrangement.

According to the obstacle detection apparatus of the present invention, a plurality of ultrasonic transducers constitute a sensor unit, a sensing area along the direction of robot movement is divided into a plurality of regions, position data for each divided region is arithmetically or experimentally obtained, resultant data is stored in a memory, and the data is retrieved from the memory in response to reflected wave time data for the obstacle, thereby obtaining the position data. As a result, the sensing region in which the obstacle is located can be easily detected without performing complicated calculations.

In order to achieve the above object of the present invention, there is provided an obstacle detection apparatus comprising:

ultrasonic wave radiating means including a plurality of ultrasonic transducers;

memory means for prestoring position data of a predetermined sensing area;

ultrasonic wave receiving means for receiving at least at two points a wave reflected by an obstacle upon radiation of said ultrasonic wave radiating means;

measuring means for measuring a time between the radiation and reception of the wave reflected by the obstacle; and position detecting means for retrieving the data from the memory means on the basis of a value measured by the measuring means and detecting a position of the obstacle within the sensing area.

BRIEF DESCRIPTION OF THE DRAWINGS

Other objects and features of the present invention will be apparent from the following description taken in connection with the accompanying drawings, in which:

FIGS. 5A and 5B show flow charts for explaining the obstacle position recognition operation.

DETAILED DESCRIPTION OF THE PREFERRED EMBODIMENTS

Figure 1:
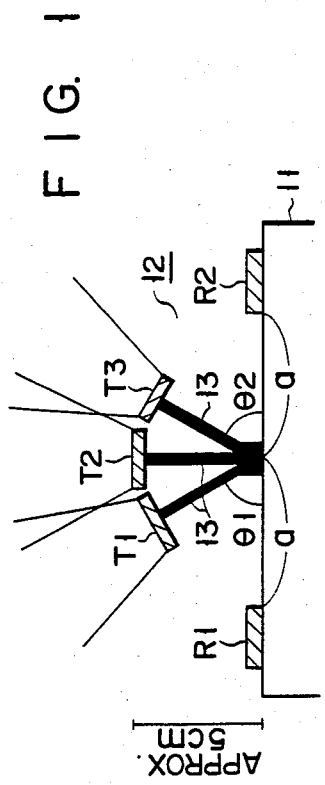
FIG. 1 is a plan view showing the sensor arrangement of an ultrasonic sensor unit.

Referring to FIG. 1, an ultrasonic sensor unit 12 having ultrasonic transducers is arranged on the front surface of a robot 11. More particularly, three transmitters T1, T2 and T3 are radially mounted at the central portion of the front surface of the robot 11. Receivers R1 and R2 are arranged at two end positions equally spaced apart by distance a from the center of the robot 11. In this case, the transmitters T1, T2 and T3 are supported to extend, for example, 5 cm from the front surface of the robot 11 through corresponding supports 13. The central transmitter T2 extends directly straight, and the end transmitters T1 and T3 are arranged inclined at angles $\theta 1$ and $\theta 2$ with respect to the central transmitter T2 mounted on the straight support. Each of the angles $\theta 1$ and $\theta 2$ is set at about 60 degrees. The directivity angle of each of the transmitters T1 and T3 is about 40 degrees, and the directivity angle of the transmitter T2 is about 50 degrees.

Figure 2:
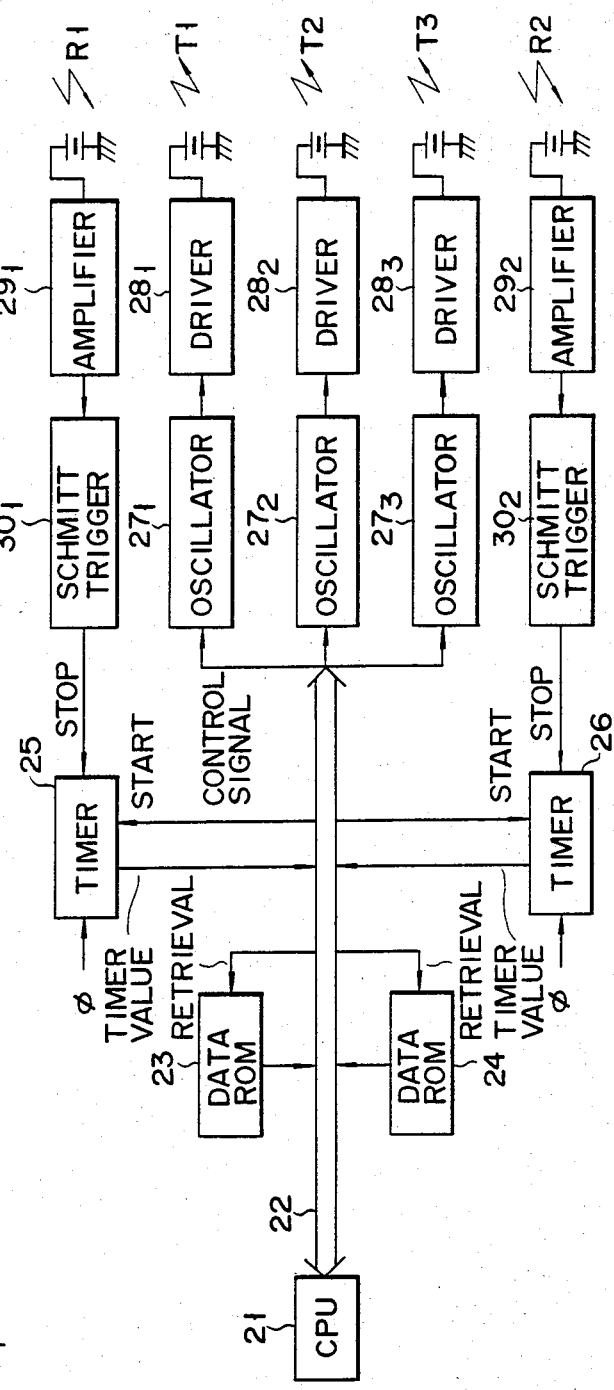
FIG. 2 is a block diagram of the ultrasonic sensor unit shown in FIG. 1.

A controller for controlling the ultrasonic sensor unit 12 will be described with reference to FIG. 2. A central processing unit (CPU) 21 is connected to data ROMs 23 and 24 and timers 25 and 26 through a bus line 22. The timers 25 and 26 measure a time from radiation of an ultrasonic wave to reception of a reflected wave. The data ROMs 23 and 24 prestore position recognition data of an obstacle which is arithmetically or experimentally derived from the measured time data. The timers 25 and 26 receive a start instruction from the CPU 21 and perform counting in response to clock pulses $\phi$. The CPU 21 is further connected to first through third oscillators $27_1$ through $27_3$ through the bus line 22. The oscillators $27_1$ through $27_3$ start oscillation in response to a control signal from the CPU 21 and cause drivers $28_1$ through $28_3$ connected thereto to drive the transmitters T1, T2 and T3, respectively. Ultrasonic waves are radiated forward from the transmitters T1, T2 and T3 of the robot 11. The radiated ultrasonic waves are reflected when an obstacle is present along the radiation path thereof. The reflected waves are received by the receivers R1 and R2 and then amplified by amplifiers $29_1$ and $29_2$, respectively. The amplified signals are shaped by Schmitt trigger circuits $30_1$ and $30_2$ connected to the amplifiers $29_1$ and $29_2$, respectively. The obtained signals are supplied as stop signals to the timers 25 and 26, respectively.

The time values of the timers 25 and 26 are supplied to the CPU 21 through the bus line 22.

Figure 3:
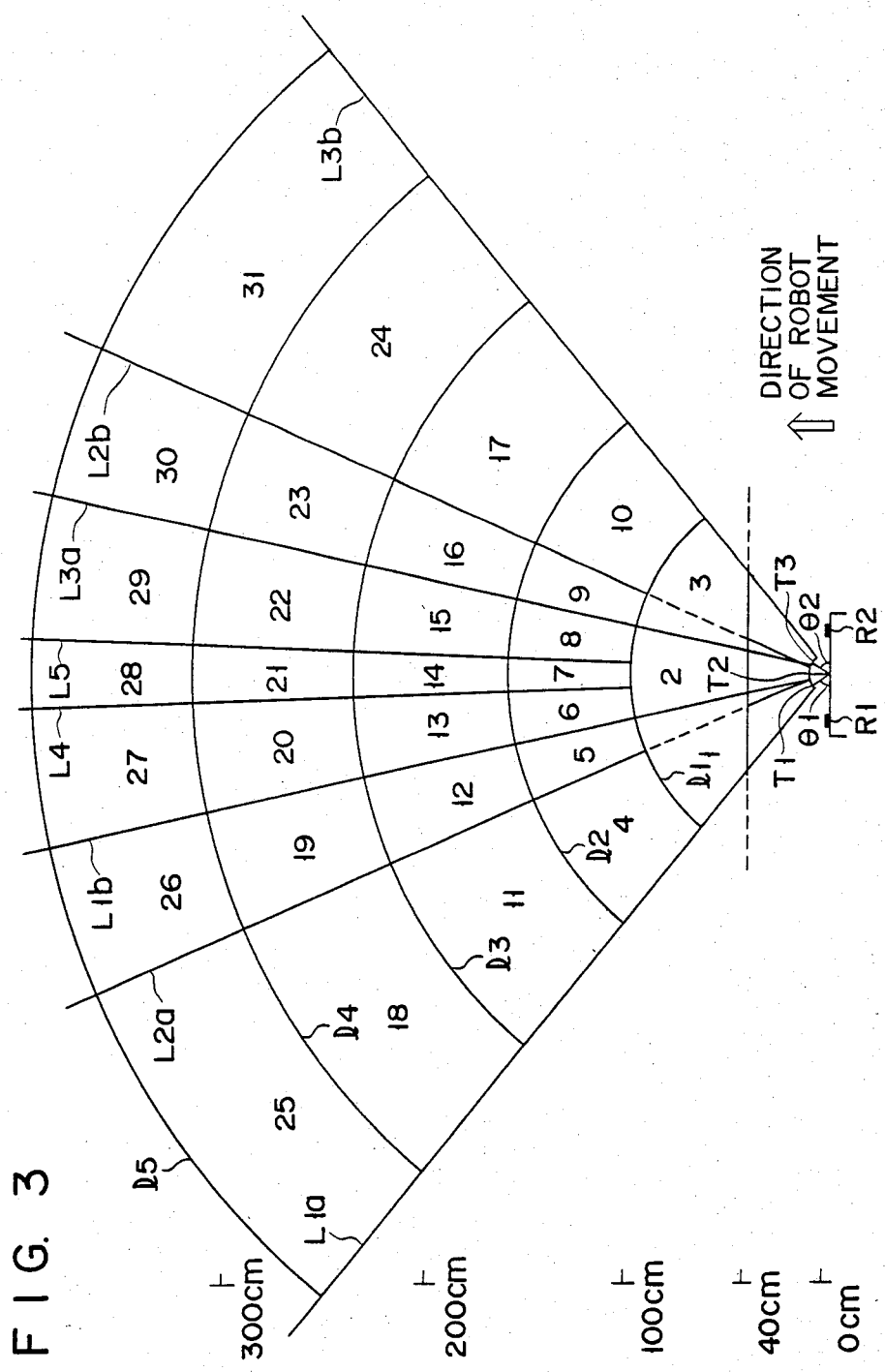
FIG. 3 is a schematic view for explaining a setting mode of a sensing area.

A case will be described wherein data are stored in the ROM 23 and 24. As shown in FIG. 3, a sensing area as front space of the robot 11 is set. The sensing area is used to determine the detection precision for an obstacle. Referring to FIG. 3, a sector-shaped sensing area ranging from about 40 cm ahead of the front surface of the robot 11 to 400 cm is divided into 1st to 31st sensing regions. Each boundary line for determining a direction in the sensing area is determined by the directivity ranges of the transmitters T1, T2 and T3. More particularly, lines L1a and L1b define the directivity range of the transmitter T1. Lines L2a and L2b define the directivity range of the transmitter T2, and lines L3a and L3b define the directivity range of the transmitter T3. As shown in FIG. 3, the region defined by the lines L1b and L3a is further divided by lines L4 and L5 into regions. The boundary lines for determining the distances from the robot within the sensing area comprise equidistantly spaced lines 11 through 15 with equal intervals. The sensing area is determined as described above. In the sensing area shown in FIG. 3, the central portions are divided into small regions so as to provide high-precision recognition, and the end portions are divided into large regions. In addition, the regions located within the range between 40 cm and 150 cm are smaller than those located within the range between 150 cm and 400 cm. In other words, the central and short-range regions within the sensing area are more important than the remaining regions. An obstacle within the sensing area can be recognized by retrieving data from the ROMs 23 and 24 in accordance with the time values of the timers 25 and 26 which are derived from the reception signals from the receivers R1 and R2.

Figure 4:
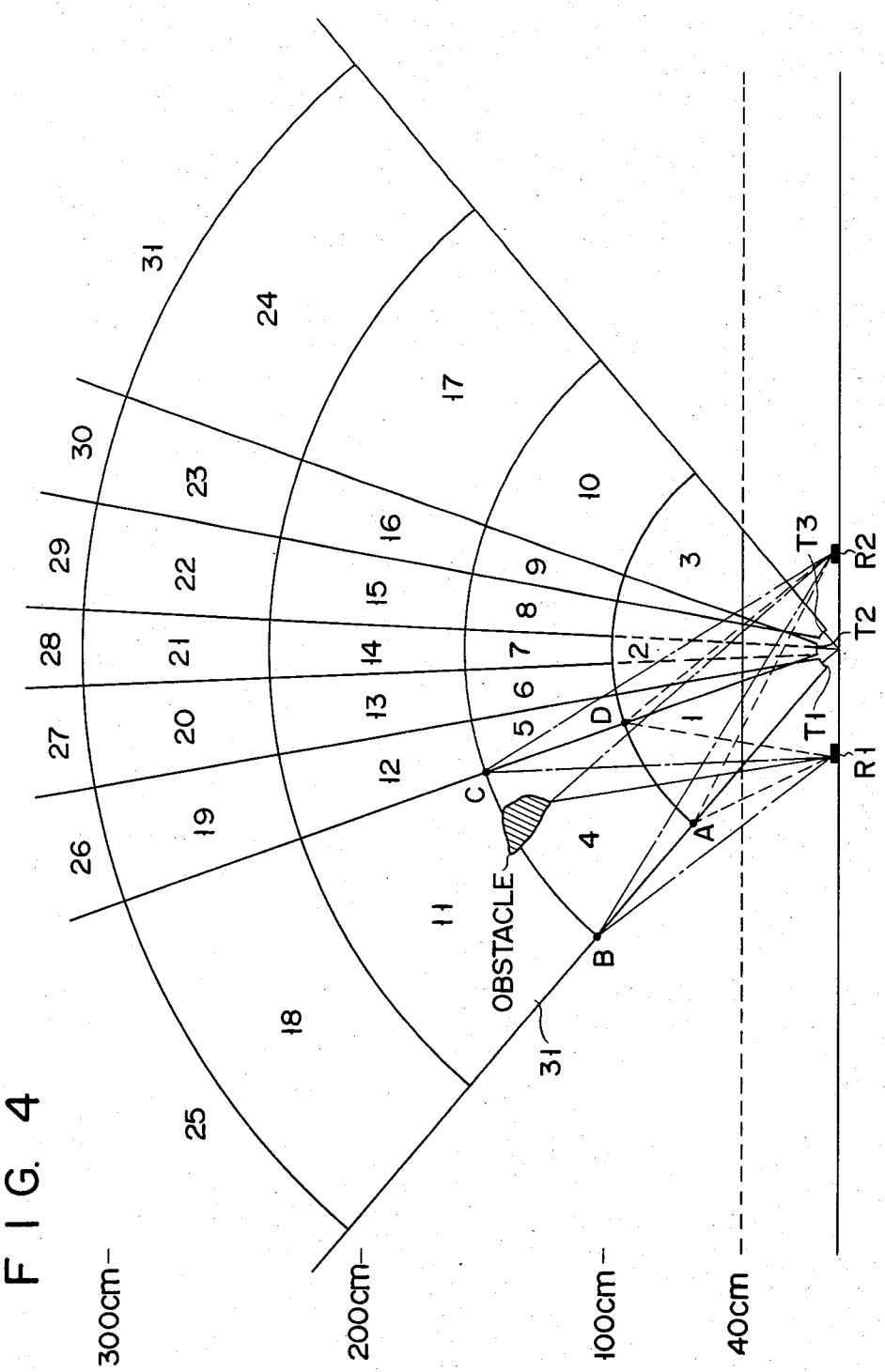
FIG. 4 is a schematic view for explaining the case wherein position data in each sensing area is obtained and the resultant data is stored in a memory.

When the sensing area is set, possible combinations of measuring distances to be measured by the receivers R1 and R2 within the respective sensing regions are arithmetically or experimentally obtained. For example, when combinations of reflected waves in region 4 in FIG. 4 which can be received by the receivers R1 and R2 are to be obtained, measured values of the receivers R1 and R2 at a plurality of points, e.g., points A, B, C and D are obtained. Similarly, combinations of measured values of the receivers R1 and R2 for any other sensing region are obtained. In this manner, the reflected wave time values measured by the receivers R1 and R2 for regions 1 through 31 are prestored in the ROMs 23 and 24, respectively. When an obstacle is detected, data are retrieved from the ROMs 23 and 24 and a position of the obstacle can be recognized in accordance with a matrix derived by the time values of the timers 25 and 26 in accordance with the signals received by the receivers R1 and R2. For example, when an obstacle is located in sensing region 14 shown in FIG. 3, the time value of the timer 25 is the same as that of the timer 26. However, when an obstacle is located in region 15, the time value of the timer 25 is larger than that of the timer 26. When an obstacle is located in region 13, the time value of the timer 25 is smaller than that of the timer 26. When an obstacle is located in region 12, the ultrasonic wave can be detected upon radiation from the transmitter T1 or T2, thereby detecting the presence of the obstacle in region 12. Similarly, when an obstacle is located in region 16, the obstacle can be detected upon radiation from the transmitter T2 or T3 and presence of the obstacle can be confirmed.

Figure 5A:
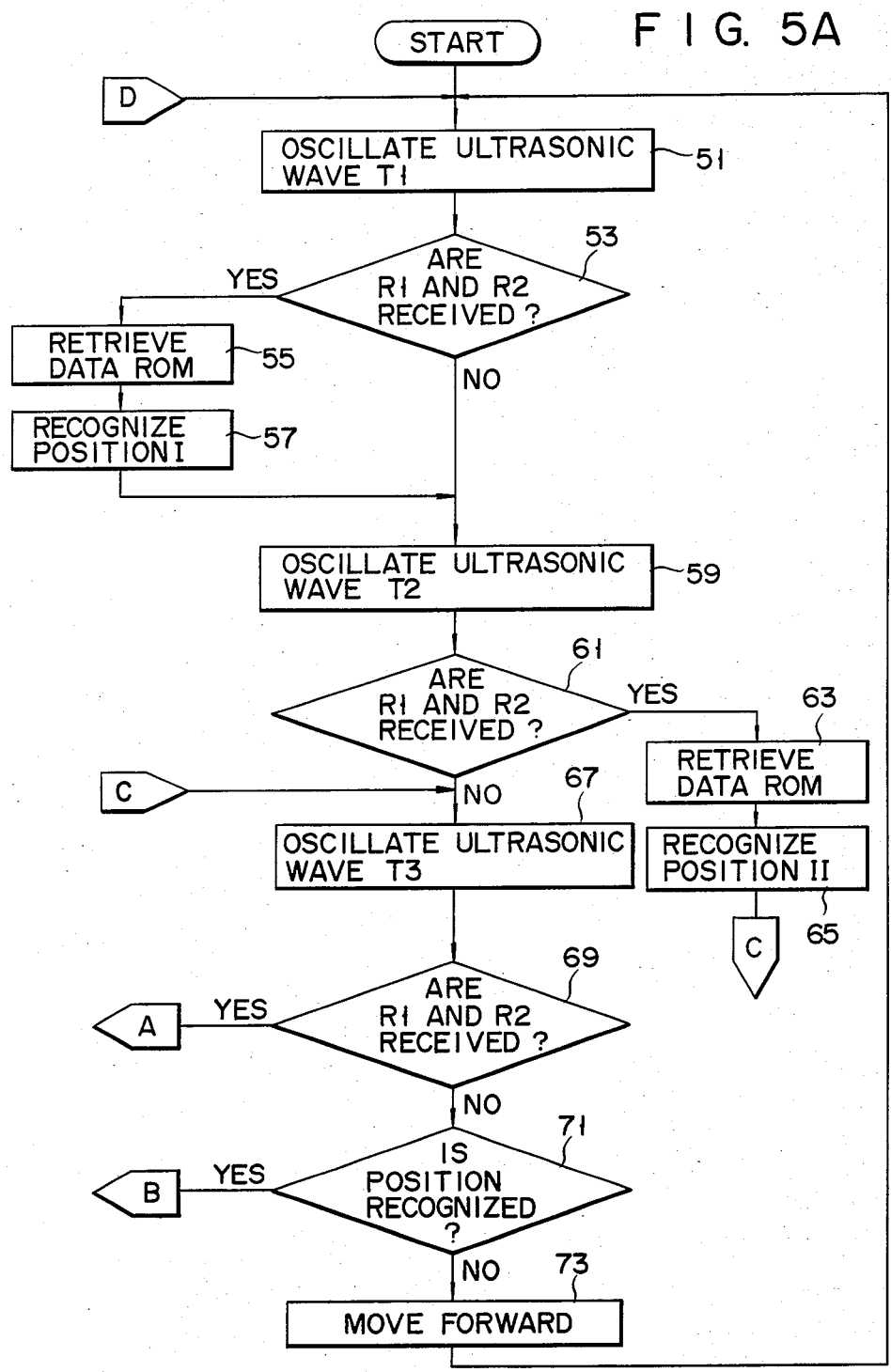

The overall operation of the system will be described with reference to FIGS. 5A and 5B. The robot monitors the presence/absence of an obstacle for every predetermined cycle while it is running along a route. In step 51 in FIG. 5A, the CPU 21 supplies an operation instruction to the oscillator $27_1$ which is then started. The oscillator $27_1$ causes the driver $28_1$ to drive the transmitter T1. The transmitter T1 emits ultrasonic waves within the range defined by the lines L1a and L1b in FIG. 3. In this case, the CPU 21 supplies a start instruction to the timers 25 and 26 which are then started. In step 53, the CPU 21 checks whether or not the receivers R1 and R2 received waves reflected by an obstacle. If an obstacle is present within the sensing regions 1 through 31, the reflected waves are received by the receivers R1 and R2. The reception signals are amplified by the amplifiers $29_1$ and $29_2$ and are shaped by Schmitt trigger circuits $30_1$ and $30_2$, respectively. The waveshaped signals are supplied as stop signals to the timers 25 and 26, respectively. The timers 25 and 26 are stopped in response to the stop signals, and their time values are supplied to the CPU 21 through the bus line 22. When the CPU 21 receives the time data from the timers 25 and 26, the CPU 21 retrieves data from the ROMs 23 and 24 on the basis of the time data. In step 57, the CPU 1 checks which sensing regions 1 through 31 include the obstacle. In this case, regions 1, 4, 5, 11, 12, 18, 19, 25 and 26 are given as a possible obstacle sensing range. Among these regions, regions 4, 11, 18 and 25 are regions to be detected only when the transmitter T1 is operated. Regions 1, 5, 12, 19, and 26 are regions to be detected when the transmitters T1 and T2 are operated together. When the operation in step 57 is completed or if NO in step 53, the flow advances to step 59. In step 59, the CPU 21 causes the oscillator $27_2$ to drive the transmitter T2 which emits ultrasonic waves within the range defined by the lines L2a and L2b. The CPU 21 checks in step 61 whether or not the reflected waves are received by the receivers R1 and R2. If YES in step 61, the time data of the timers 25 and 26 are supplied to the CPU 21 in step 63, thereby causing the CPU 21 to retrieve data from the ROMs 23 and 24. In step 65, the CPU 21 recognizes the position of the obstacle. When the transmitter T2 is operated as described above, regions 2, 6, 7, 8, 13, 14, 15, 20, 21, 22, 27, 28 and 29 can be detected only when the transmitter T2 is operated. Regions 3, 9, 16, 23 and 30 are regions to be detected when the transmitters T2 and T3 are simultaneously operated. In this case, regions 7, 14, 21 and 28 are located substantially in the center of the sector-shaped sensing area. When an obstacle is located in one of these regions, the time values from the timers 25 and 26 are substantially the same. When the operation in step 65 is completed or if NO in step 61, the flow advances to step 67. In step 67, the CPU 21 causes the oscillator $27_3$ to drive the transmitter T3 which emits ultrasonic waves within the range defined by the lines L3a and L3b. The CPU 21 checks in step 69 whether or not the reflected waves are received by the receivers R1 and R2. If YES in step 69, the time data of the timers 25 and 26 are supplied to the CPU 21 so as to cause the CPU 21 to retrieve data from the ROMs 23 and 24 in step 75. In step 77, the CPU 21 recognizes the position of the obstacle. When the transmitter T3 is operated, it alone can sense regions 10, 17, 24 and 31. Regions 3, 9, 16, 23 and 30 can be sensed when the transmitters T2 and T3 are simultaneously operated. If NO in step 69, the flow advances to step 71. The CPU 21 checks in step 71 whether or not position recognition in step 57 or 65 is performed. If NO in step 71, i.e., when the CPU 21 determines that an obstacle is not present along the route of the self-running robot, the robot runs without route adjustment in step 73. Thereafter, the flow returns to step 51 wherein position recognition of an obstacle described above is repeated.

However, if YES in step 71, or when the CPU 21 determines that position recognition in step 77 is performed, the flow advances to step 79. In step 79, the CPU 21 performs entire obstacle recognition in accordance with the respective position recognition results in steps 57, 65 and 77 and checks which regions 1 through 31 include the obstacle. In step 81, the CPU 21 controls steering, a velocity and the like of the self-running robot in accordance with the entire position recognition result, thereby preventing the robot from bumping against an obstacle.

According to the above embodiment, since the position of an obstacle and the distance between the robot and an obstacle are recognized when all retrieval operations of the transmitters T1, T2 and T3 are completed, two obstacles in, for example, regions 11 and 17 can be detected. Thereafter, the CPU 21 controls steering and the velocity of the robot, thereby substantially eliminating system failure. In addition, since data retrieved from the ROMs is performed on the basis of time values of the timers 25 and 26, and an obstacle position is detected, arithmetic operation need not be performed, and an obstacle position can be immediately determined.

Figure 6:
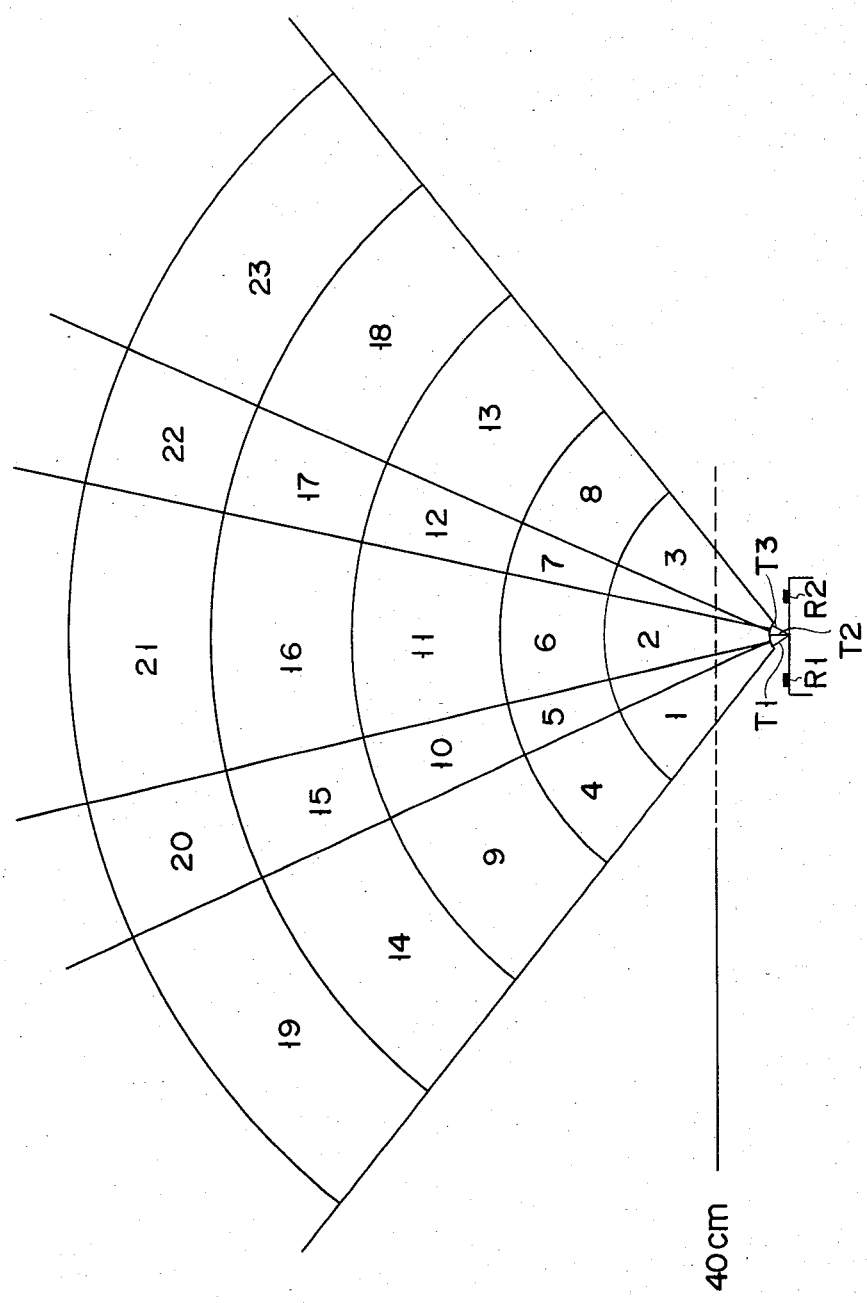
FIG. 6 is a schematic view for explaining another setting mode of a sensing area.

In the above embodiment, the two lines L4 and L5 divide the central region assigned to the transmitter T2. However, as shown in FIG. 6, the central region need not be subdivided. In this case, position recognition precision is slightly degraded but the number of sensing regions can be decreased from 31 to 23, thereby simplifying the operation.

What is claimed is:

1. An obstacle detection and location apparatus, comprising:
    ultrasonic wave radiating means including a plurality of ultrasonic transducers arranged collectively to transmit an ultrasonic wave into a predetermined sensing area;
    memory means for storing preset position data corresponding to coordinates in said predetermined sensing area, in association with time value data corresponding to each of said transducers;
    ultrasonic wave receiving means for receiving at least at two points a wave reflected by an obstacle upon operation of each of said transducers of said ultrasonic wave radiating means;
    measuring means for measuring a time between the operation of each of said transducers and reception of the wave reflected by the obstacle at each point of said receiving means; and
    position detecting means for retrieving data from the memory means on the basis of time values measured by the measuring means, and for determining a position of the obstacle within the sensing area.

2. An apparatus according to claim 1, wherein each of said ultrasonic transducers is arranged to be associated with certain regions among a plurality of regions forming said sensing area.

3. An apparatus according to claim 2, wherein said measuring means is arranged so that when the waves reflected by the obstacle are received at the two points of said receiving means, the measured time values are compared to determine which of said regions include the obstacle.

4. An apparatus according to claim 2, wherein each of said plurality of regions has a sector shape.

5. An apparatus according to claim 4, wherein said measuring means is arranged so that when the waves reflected by the obstacle are received at the two points of said receiving means, the measured time values are compared to determine which of said sector-shaped regions include the obstacle.

6. An apparatus according to claim 1, wherein the preset position data of said sensing area are arithmetically obtained.

7. An apparatus according to claim 1, wherein the preset position data of said sensing area are experimentally obtained.

8. A method of detecting and locating an obstacle, comprising the steps of:
    (a) constituting a sensor unit by a plurality of ultrasonic transducers each of which is associated with certain sensing regions forming a sensing area;
    (b) calculating position data corresponding to coordinates in said sensing regions set by step (a) and storing the position data in a memory in association with time value data corresponding to each of the transducers;
    (c) radiating ultrasonic waves from each transducer of said sensor unit, receiving waves reflected by an obstacle at least at two positions, and measuring times from emission of the ultrasonic waves from each transducer to reception of the reflected waves at each of said two positions; and
    (d) retrieving the data from said memory on the basis of the time data obtained in step (c) and determining a position of the obstacle within the sensing area.

9. A method according to claim 8, including arranging the transducers so that said sensing regions have a sector shape.

10. A method according to claim 9, including comparing the measured times when the waves reflected by the obstacle are received at the two points to determine which of the sector-shaped sensing regions include the obstacle.

11. A method according to claim 8, wherein the stored position data of said sensing area are arithmetically obtained.

12. A method according to claim 8, wherein the stored position data of said sensing area are experimentally obtained.

* * * * *